2,917,411
Patented Dec. 15, 1959

2,917,411
PROCESS OF TREATING CELLULOSIC FABRIC AND THE PRODUCT RESULTING THEREFROM

Bernard H. Kress, Lafayette Hill, Pa., assignor to Quaker Chemical Products Corporation, Conshohocken, Pa., a corporation of Pennsylvania No Drawing. Application June 12, 1957
Serial No. 665,138

2 Claims. (Cl. 117—139.4)

This invention relates to treatment of cellulose material and to novel condensation products used in such treatment. More specifically, the invention relates to the preparation of methylolated condensation products from 2-hydroxyethylamine, urea and formaldehyde.

Condensation products of urea and formaldehyde have been used for many years in textile finishing. They impart crease recovery and dimensional control, but give rise to considerable chlorine retention and hence, are not useful on white goods or fabrics regularly washed with chlorine. The condensation products of this invention obviate these disadvantages.

The dimethylol condensation product may be prepared in several ways: (1) a mole of 2-hydroxyethyl amine may be reacted with 4 moles of formaldehyde, and urea then added to complete the reaction, (2) dimethylol urea may be condensed with a mole of 2-hydroxyethyl amine, followed by further reaction with two moles of formaldehyde, (3) the 2-hydroxyethyl amine may be added to a solution containing 1 mole of dimethylol urea and two moles of formaldehyde. The order of addition is not important.

Formaldehyde, in the form of aqueous solution or paraformaldehyde may be used. Formaldehyde vapor may likewise be used in these preparations.

The methylolated condensation products obtained above may be used alone or in conjunction with urea-formaldehyde, melamine-formaldehyde or other resins applied to cellulosic textiles.

The dimethylol composition is useful in imparting crease recovery and dimensional control to cellulosic fabrics without imparting retention of chlorine from subsequent bleaching operations. The retention of chlorine bleach gives rise to considerable tendering upon ironing because of the release of hydrochloric acid fumes which attack the cellulosic molecular structure. Since the compositions described herein do not retain chlorine there is no loss of tensile strength in subsequent scorching of chlorine-bleached fabric.

An additional advantage of the compositions described herein is the lack of odor associated with the fabric after cure and subsequently after washing several times. Unsubstituted condensates such as those prepared from methyl amine, ethyl amine, butylamine and the like give rise to objectionable fishy odors, both in the products and the products processed therefrom.

The following Examples 1 to 7 serve to illustrate the preparation of the condensation products.

EXAMPLE 1

| | Parts |
|---|---|
| Dimethylol urea (60%) | 200 |
| 2-hydroxyethylamine | 61 |
| Water | 30 | were mixed and refluxed for 2 hours. Then 162 parts of formalin (37%) were added and refluxed for 10 minutes. A clear yellow liquid was obtained which was adjusted to 50% active product with water.

EXAMPLE 2

| | Parts |
|---|---|
| Urea | 30 |
| Paraformaldehyde (91%) | 66 |
| 2-hydroxyethylamine | 30.5 |
| Water | 50 | were stirred and heated under reflux for 2 hours. A clear yellow solution was obtained which was adjusted to 50% active product with water.

EXAMPLE 3

The same as in Example 2 except that the amine, paraformaldehyde and water were heated until a clear solution was obtained. The urea was then added and the solution refluxed for 90 minutes. The yellow solution was adjusted to 50% active ingredient with water.

When used in conjunction with other resins such as urea-formaldehyde condensates these condensation products may be mixed with the other resin or prepared simultaneously. These preparations are shown below.

EXAMPLE 4

| | Parts |
|---|---|
| The product of Example 1 | 100 |
| Dimethylol urea (60% paste) | 111 |
| Formalin (37%) | 89 | were refluxed together for 1 hour. A clear straw colored solution was obtained.

EXAMPLE 5

| | Parts |
|---|---|
| 2 hydroxyethylamine | 31 |
| Paraformaldehyde (91%) | 132 |
| Urea | 60 |
| Water | 133 | were refluxed together for 2 hours. The solution was adjusted to 50% active ingredient with water to yield a light straw colored solution.

EXAMPLE 6

| | Parts |
|---|---|
| Paraformaldehyde (91%) | 132 |
| Urea | 60 |
| 2 hydroxyethylamine | 77 |
| Water | 169 |

This mixture was refluxed for 2 hours to yield an almost colorless solution.

EXAMPLE 7

| | Parts |
|---|---|
| 2 hydroxyethylamine | 20 |
| Dimethylol urea (60%) | 200 |
| Paraformaldehyde (91%) | 66 |
| Water | 90 |

The mixture was stirred under reflux for 2 hours to yield an almost colorless solution.

The following products were made for comparison purposes.

EXAMPLE 8

Preparation of a methyl amine condensation product.

| | Parts |
|---|---|
| Methylamine (20%) | 155 |
| Urea | 60 |
| Paraformaldehyde (91%) | 133 |

All components were refluxed for 3 hours to yield a colorless clear solution containing 50% active ingredient.

EXAMPLE 9

Preparation of an ethylamine condensation product.

| | Parts |
|---|---|
| Dimethylol urea (60%) | 200 |
| Ethylamine | 45 |
| Water | 47 | were refluxed for 90 minutes. Then:

| | |
|---|---|
| Formalin (37%) | 162 | was added and refluxed for 20 minutes.

A clear liquid was obtained which contained 50% active material.

To illustrate the use of the products of Examples 1 to 8, solutions of the products neutralized to pH of 7 were applied to fabric in the following manner. Cotton sheeting (Bleached 80 x 80) was premarked at 18" with a "Sanforize" test marker in the warp and fill direction, then padded through solutions containing 10% of the products listed, each solution also containing 1.5% of 2-amino-2-methylpropanol hydrochloride known as Catalyst AC (Monsanto). Pressure on the pad roll was adjusted to 100% wet pick-up. The fabric was then framed at the original dimension, dried at 180° F. and cured at 325° F. for 90 seconds in a forced air electric oven. The fabrics were then after-washed at 120° F. in an automatic home washer and subsequently tested as follows:

Chlorine retention—AATCC[1] Tentative 69–52.
Crease recovery—AATCC[1] Tentative 66–53.
Tensile test—Federal Spec. CCC–T–191B, Method 5102—2" width.

[1] Technical Manual—American Association of Textile Chemists and Colorists.

The results are shown below.

*Table I*

| Product | Odor | Monsanto, degrees Warp and Fill | Tensile Strength, Lbs. | |
|---|---|---|---|---|
| | | | Scorched | Chlorinated and Scorched |
| Ex. 1 | No fishy odor | 244 | 43.1 | 40.0 |
| Ex. 8 | Fishy | 255 | 37.2 | 35.4 |
| Ex. 9 | Fishy | 249 | 37.0 | 36.0 |
| Water Control | None | 167 | 52.6 | 50.5 |

In order to have acceptance as a commercial finish a product should, under the conditions of testing show a Monsanto (warp and fill) of at least 220 degrees, show no more than 20% loss upon chlorination, should possess no amine odor and should not yellow white fabric. It may be seen that the 2-hydroxyethyl product is free of fishy odor and gives rise to acceptable commercial crease recovery.

The products which are combined with other resins such as urea-formaldehyde condensation products are also useful in imparting crease recovery to cellulosic fabrics. This is shown in Table II.

*Table II*

| Product | Percent Amine Conds. Prod. | Monsanto, Warp and Fill | Tensile Strength, Lbs. | |
|---|---|---|---|---|
| | | | Scorched | Chlorinated and Scorched |
| Ex. 2 | 100 | 244 | 43.1 | 40.0 |
| Ex. 5 | 50 | 250 | 40.1 | 37.8 |
| Ex. 7 | 33 | 272 | 40.3 | 34.8 |
| Ex. 6 | 12.5 | 282 | 36.3 | 30.9 |
| Dimethylol urea | 0 | 265 | 40.0 | 0 |
| Water control | | 167 | 52.6 | 50.5 |

Very little significant decrease in chlorinated tensile is observed until less than 10% of the condensation product is used. This then is the practical lower limit of concentration when used with other resins or mixtures thereof.

In all cases the molar ratio of ethanolamine (2-hydroxyethylamine) to urea used in preparation of the condensate should be at least 1:1 up to about 1:10. At least 4 moles of formaldehyde should be available for each mole of amine or 4 moles for each mole of urea.

To be useful in imparting durable crease recovery or dimensional control at least 0.5% to about 20% of active product should be used on dry fabric. The amount of catalyst to be used in treating cellulosic fabrics should be from 10% to 200% of the active product on the fabric.

Cure temperatures useful in these preparations are those sufficient to effect reaction with the cellulose. Time of curing varies inversely with temperature. As a practical lower limit a temperature 180° F. requiring a long cure time may be set. No upper limit beyond scorching or destroying fabric properties need be set.

Up to 90% of other reactive resins or resin precursors may be used in conjunction with the amine condensation products. These include urea-formaldehyde, melamine-formaldehyde, dimethylol ethylene urea, polyacetals, epoxy-containing reactants and resins, dialdehydes, dialdehyde acetals, acrolein and ketone-formaldehyde condensation products, ketone condensation products, alkyd resins, polyvinyl acetate resins and copolymers, acrylic and methacrylic resins and copolymers, polyvinyl halide resins, styrene copolymers, vinylidene copolymers, acrylonitrile copolymers, and the like.

The products disclosed herein are useful in imparting crease recovery and dimensional control to cellulosic textiles. Similarly, they may be used for treating paper for wet strength, for setting of starches, modified starches, and proteins. Cellulosic fibers such as hemp, jute, and ramie may also be treated with these products.

Various acidic type compounds, potentially acidic compounds, or salts, may be used as catalysts for cure of these products. These include ammonium salts, amine salts, magnesium chloride, zinc chloride, tartaric, citric, and glycolic acids, and the like, aluminum chloride and sulfate, and so on. The quantities useful may vary from 1 to 50% of the product solids. Time and temperature vary inversely and are sufficient if the desired effect is obtained.

The products may be applied by padding, or by adsorption, as in a dye beck. The products may be applied to paper either in size press application, by spray or in the beater.

The products are also useful in treating regenerated cellulose films. The product also has merit in treating cellulose fibers in admixture with Dacron, wool, polyacrylonitrile-containing fibers, nylon fibers, cellulose acetate fibers, and the like.

By the expression cellulose fabrics I refer to those obtained by weaving and non-woven. The term cellulose refers to all forms of regenerated cellulose, including that obtained by hydrolysis of cellulose esters, cotton and linen. The expression cellulose materials refers to all the aforementioned materials.

I claim:

1. The process of treating cellulose fabric which comprises applying to cellulose fabric an aqueous bath containing an acidic catalyst and a dimethylol condensation product of 2-hydroxyethylamine, urea and formaldehyde, said condensation product comprising at least 4 moles of formaldehyde per mole of urea and the 2-hydroxyethylamine in molar ratio to the urea of at least 1:1 up to about 1:10, said condensation product being applied to the cellulose fabric in amount of from about 0.5 to about 20% by weight of the dry cellulose fabric, said catalyst being applied to the cellulose fabric in amount from about 10% to about 200% by weight of the dimethylol condensation product, and drying the treated cellulose fabric at an elevated temperature until the cellulose fabric is modified.

2. Cellulose fabric made by the process as defined in claim 1.

References Cited in the file of this patent

UNITED STATES PATENTS

| | | |
|---|---|---|
| 2,561,973 | Cohen | July 24, 1951 |
| 2,626,251 | James et al. | Jan. 20, 1953 |